United States Patent [19]
Shackle et al.

[11] Patent Number: 5,374,875
[45] Date of Patent: Dec. 20, 1994

[54] HIGH-POWER FACTOR CIRCUIT FOR ENERGIZING GAS DISCHARGE LAMPS

[75] Inventors: Peter W. Shackle, Arlington Heights; John G. Konopka, Barrington, both of Ill.

[73] Assignee: Motorola Lighting, Inc., Buffalo Grove, Ill.

[21] Appl. No.: 18,131

[22] Filed: Feb. 16, 1993

[51] Int. Cl.$^5$ ............... H02M 5/00; H05B 41/14
[52] U.S. Cl. .................................................. 315/247
[58] Field of Search ............... 315/127, 247, 209 R

[56] References Cited

U.S. PATENT DOCUMENTS

| | | | |
|---|---|---|---|
| 4,005,335 | 1/1977 | Perper | 315/224 |
| 4,017,785 | 4/1977 | Perper | 321/4 |
| 4,045,711 | 8/1977 | Pitel | 315/205 X |
| 4,075,476 | 2/1978 | Pitel | 315/209 R |
| 4,109,307 | 8/1978 | Knoll | 315/247 X |
| 4,808,887 | 2/1989 | Fuhnrich et al. | 315/247 |
| 5,010,277 | 4/1991 | Courier de Mere | 315/200 R |
| 5,148,087 | 9/1992 | Moisin et al. | 315/291 |
| 5,150,013 | 9/1992 | Bobel | 315/209 R |

FOREIGN PATENT DOCUMENTS 2115627A 2/1982 United Kingdom.

Primary Examiner—Tony M. Argenbright
Attorney, Agent, or Firm—J. Ray Wood

[57] ABSTRACT

A circuit for powering a gas discharge lamp from a source of a first frequency AC power has a a first rectifier for converting the first frequency AC power into a first DC power, a capacitor and driver for converting the DC power to a second frequency AC power. A second rectifier is used to increase the power factor for the circuit. A control is provided to disable the second rectifier if the lamp is removed from the circuit.

19 Claims, 1 Drawing Sheet

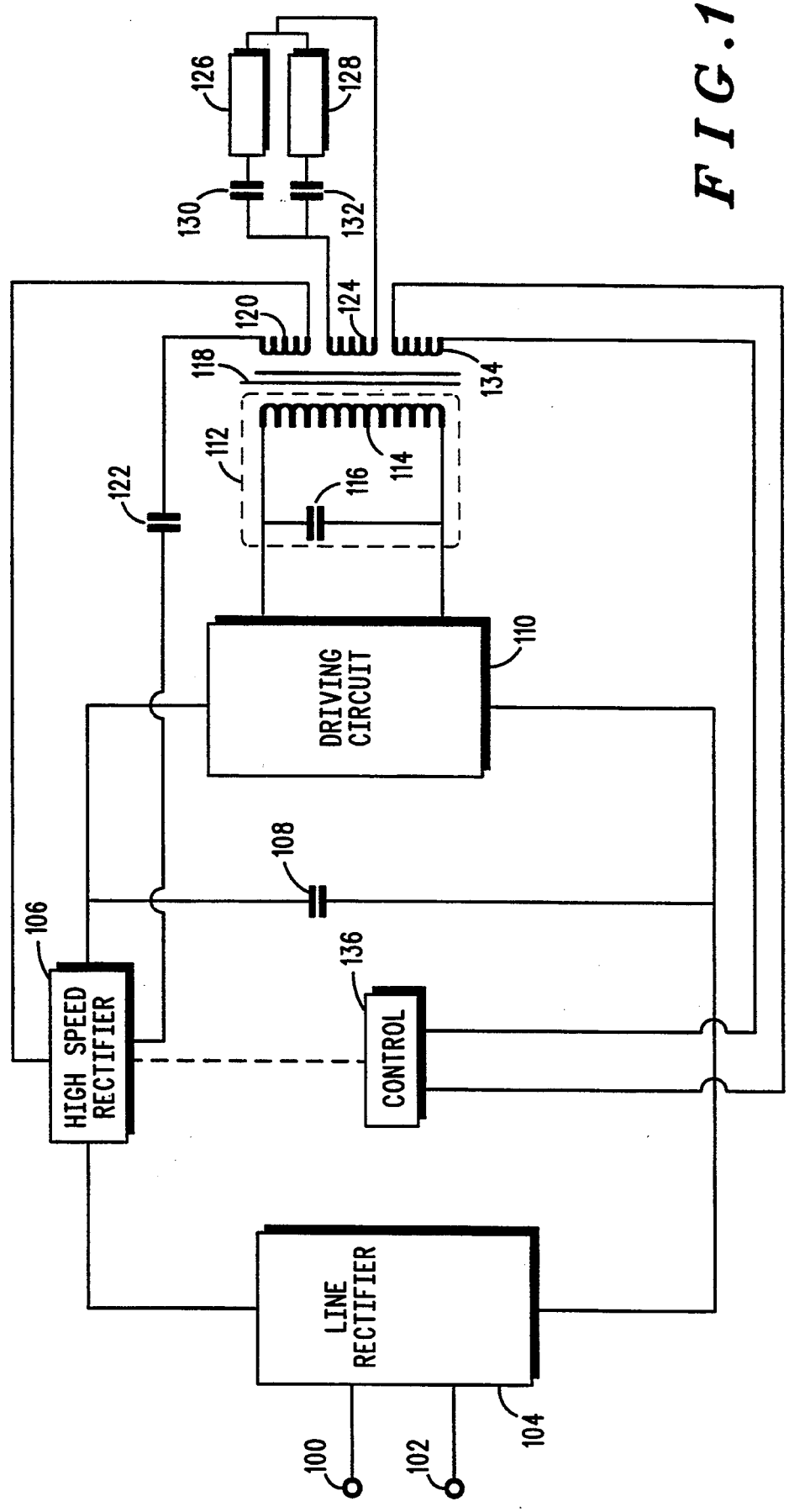

HIGH-POWER FACTOR CIRCUIT FOR ENERGIZING GAS DISCHARGE LAMPS

BACKGROUND OF THE INVENTION

Gas discharge lamps can be operated most efficiently by AC (alternating current) power at a relatively high frequency (on the 35 KHz [kilohertz]). However, line AC power is supplied by utility companies at low frequencies (around 50 Hz [hertz] or 60 Hz). To obtain high efficiency operation of the lamps, the AC power at the first low frequency is converted to AC power at a second high frequency.

The conversion of the AC power from one frequency to another is accomplished by a ballast circuit. The AC power at the first low frequency is rectified into DC (direct current) power, and then stored as energy in a relatively large electrolytic capacitor. The energy stored in the electrolytic capacitor is then "chopped" by an inverter into AC power at a second high frequency.

In this kind of circuit, whenever the voltage of the line AC power is greater than the voltage stored in the electrolytic capacitor, a relatively large surge of current passes into the electrolytic capacitor, causing the line current drawn to be "peaky" and having a poor power factor.

One solution is to place a floating voltage supply in series with the incoming line to the capacitor. Such a supply presents several problems. First, the voltage of the supply must be controlled so as to match the voltage on the electrolytic capacitor, otherwise the waveform of the power drawn from the line will be distorted. Second, the impedance level of the supply must be adjustable so as to control the amount of power drawn from the power line. If not, the inverter will either produce too much power or there will be little correction of the power factor. Finally, the source of the power for the floating voltage supply must be stable and have a low impedance.

BRIEF DESCRIPTION OF THE DRAWINGS

FIG. 1 is a diagram of a circuit for energizing gas discharge lamps.

DESCRIPTION OF THE PREFERRED EMBODIMENT

FIG. 1 shows a circuit suitable for energizing gas discharge lamps.

Terminals 100, 102 of line rectifier 104 are coupled to a source of AC power at a relatively low frequency, such as 60 cycles per second. Rectifier 104 may be a bridge rectifier. Line rectifier 104 converts the AC voltage to a DC voltage. The positive output terminal of line rectifier 104 is coupled to a high frequency rectifier 106. (High frequency rectifier 106 could be connected to the negative output terminal of line rectifier 104 with appropriate orientation of the remaining circuit elements.) High frequency rectifier 106 is suitable for operation at relatively high frequencies such as 35 KHz.

The positive output terminal of line rectifier 104 is coupled to the negative DC output terminal of high frequency rectifier 106. The positive DC output terminal of high frequency rectifier 106 is coupled to the negative output terminal of line rectifier 104 by storage capacitor 108.

Storage capacitor 108 provides a stable reservoir of charge at a relatively constant voltage for running driving circuit 110. Storage capacitor 108 is charged by the output from series connection of line rectifiers and high frequency rectifier 106.

Driving circuit 110 consists of switches and inductors connected to induce alternating currents around the parallel resonant tank circuit 112. Suitable driving circuits would be the high efficiency, self-oscillating LC (inductor-capacitor) multivibrator circuit shown in Konopka, U.S. Pat. No. 5,150,013, the circuit for driving a gas discharge lamp load shown in Moisin, U.S. Pat. No. 5,148.087, as well as other well known inverter circuits, such as those containing two transistors and such a circuit has an electrically symmetric output waveform.

Driving circuit 110 has a pair of input terminals and two or more output terminals. The input terminals of driving circuit 110 are connected across storage capacitor 108. The output terminals are coupled to parallel resonant tank circuit 112 in a manner suitable to excite parallel resonant tank circuit 112 into oscillation.

Parallel resonant tank circuit 112 consists of tank inductor 114 connected in parallel with tank capacitor 116. Preferably, tank inductor 114 is part of a combined inductor and transformer assembly, so that additional output windings are present on core 118.

A feedback circuit from the output to the input of driving circuit 110 is formed by power factor correction winding 120, high frequency rectifier 106 and capacitor 122.

Power factor correction winding 120 is present on core 118. Power factor correction winding 120 is connected through capacitor 122 to the AC inputs of high frequency rectifier 106. Thus, high frequency rectifier 106 is energized by power factor correction winding 120, producing a DC voltage across the output terminals of high frequency rectifier 106. The number of turns on the power factor correction winding determines the amplitude of the voltage of the AC power coupled to the inputs of high frequency rectifier 106. By adjusting the number of turns in power factor correction winding 120, there is a means for controlling the level of the DC voltage across the output terminals of high frequency rectifier 106. Matching the level of the DC voltage across the output terminals of high frequency rectifier 106 to the voltage level of the DC energy stored in storage capacitor 108 significantly improves the power factor of the circuit.

The DC output voltage of high frequency rectifier 106 is approximately equal to the voltage across capacitor 108. Therefore, the current from line rectifier 104 is limited only by the output impedance at 60 Hz of high frequency rectifier 106. The output impedance of high frequency rectifier 106 is controlled by capacitor 122.

The operating power level of the inverter is controlled by the capacitance of capacitor 122. If capacitor 122 has a large capacitance, the output impedance of high frequency rectifier 106 is low, resulting in a high level of power transfer into the inverter. Conversely, if capacitor 122 has a small capacitance, the level of power transfer into the inverter is low. Thus, capacitor 122 acts as a means to control the impedance of high frequency rectifier 106.

At low frequencies, the output impedance of high frequency bridge rectifier 106 is almost purely resistive, and is inversely proportional to the capacitance of capacitor 122. The incoming line current therefore is proportional to the incoming line voltage, and the waveform of the line current is the same shape as the waveform for the incoming line voltage and in phase. For a sinusoidal input voltage, a sinusoidal input current results, thus achieving a high power factor.

Thus, it is possible with this circuit to control both the DC voltage level at the output of high frequency rectifier 106 and the impedance of high frequency rectifier 106. By carefully selecting the voltage level and the impedance, extremely high power factors can be obtained.

Load winding 124 is wound on core 118. Load winding 124 is connected to loads 126, 128 through current limiting capacitors 130, 132. When energized, load winding 124 powers loads 126, 128.

Control winding 134 is wound on core 118. Control winding 134 is coupled to control 136. Control 136 may govern the opening and closing of a switch, such as a transistor, a silicon controlled rectifier, or any other electric or electronic device used to open and close electrical connections. In normal operation, the switch would be open.

Control 136 senses when loads 126, 128 are removed from the circuit. A power surge occurs in control winding 134, and is sensed by control 136. Control 136 then disables high speed rectifier 106. Thus, driver 110 is energized only by the peak of the line voltage which appears across storage capacitor 108. If high speed rectifier 106 was not disabled, the power feedback via winding 120 would continually increase the voltage on storage capacitor 108, eventually damaging the inverter.

If high speed rectifier 106 is a bridge rectifier, control 136 comprises in part a switch between the DC outputs of the high speed rectifier. If loads 126, 128 are removed, the switch closes, connecting the DC outputs of the bridge rectifier.

We claim:

1. A circuit for powering a gas discharge lamp from a source of a first frequency AC power comprising:
   a first rectifier for converting the first frequency AC power into a first DC power;
   a capacitor coupled to the rectifier for storing the DC power as energy;
   a driver having a driver input and a driver output, which produce an electrically symmetric output, the driver input coupled to the capacitor for converting the energy stored in the capacitor into a second frequency AC power;
   a second rectifier having a second rectifier input and a second rectifier output, the second rectifier input coupled to the inverter output for converting some of the second frequency AC power into a second DC power;
   voltage control means for adjusting the voltage of the second frequency AC power at the input of the second rectifier; and
   impedance control means for controlling the impedance of the second rectifier.

2. The circuit of claim 1 including a control for disabling the second rectifier if the lamp is removed from the driver output.

3. The circuit of claim 2 where the driver includes a two transistor inverter, and the driver output is coupled to the lamps by way of a parallel resonant tank circuit.

4. The circuit of claim 3 where the inverter is coupled to the second rectifier by a transformer having a primary winding and a secondary winding, and the voltage control means is the ratio of the number of turns on the primary winding to the number of turns on the secondary winding.

5. The circuit of claim 2 where the impedance control means is a capacitor in series with the second rectifier.

6. The circuit of claim 5 where the second rectifier has a pair of DC outputs, and the control comprises a switch placed between tile DC outputs, the switch being normally open, but which closes when the lamp is removed from the driver output.

7. A method of powering a gas discharge lamp with a circuit from a source of AC power comprising the steps of:
   rectifying the AC power at a first frequency into a first DC power;
   storing the first DC power as energy in a capacitor;
   inverting the stored energy into AC power at a second frequency with a parallel resonant tank circuit;
   energizing the lamp with the some of the AC power at a second frequency;
   rectifying with a rectifier some of the AC power at a second frequency into a second DC power;
   using the second DC power to control the power factor of the circuit; and
   controlling the impedance of the rectifier.

8. The method of claim 7 where controlling of the impedance of the rectifier is performed by a capacitor in series with the rectifier.

9. The method of claim 7 including the step of controlling the voltage of the second DC power to match the voltage of the first DC power.

10. The method of claim 9 where the AC power at a second frequency is derived from a transformer having a primary winding and a secondary winding, where the primary winding is coupled to the AC power at a second frequency and the secondary winding is coupled the rectifier.

11. The method of claim 10 where the voltage of the AC power at the second frequency is controlled by-the ratio of the number of turns on the secondary winding to the number of turns on the primary winding.

12. The method of claim 11 where the secondary winding is coupled to the rectifier by way of a capacitor having an impedance.

13. The method of claim 12 where both the voltage of the AC power at a second frequency and the impedance of the capacitor are matched to provide a high power factor.

14. A circuit for correcting the power factor of a power line driven gas discharge lamp power source, having a resonant capacitor and resonant inductor connected together in parallel, the resonant inductor having at least two auxiliary windings and operated on by a driving circuit so that an alternating current flows around the circuit thus formed; characterized in that one auxiliary winding is used for driving a lamp and another auxiliary winding is connected by a feedback circuit, the feedback circuit comprising a capacitor in series with a full bridge rectifier, to cause the line current drawn from the power line to be proportional to, in phase with, and have the same waveform shape as the power line voltage.

15. The circuit of claim 14 where the driving circuit is an inverter.

16. The circuit of claim 15 where the inverter is a half-bridge two transistor inverter.

17. The circuit of claim 14 where the inverter is a half-bridge two transistor inverter.

18. A circuit for correcting the power factor of a power line driven gas discharge lamp power source, having a resonant capacitor and resonant inductor connected together in parallel, the resonant inductor having at least two auxiliary windings and operated on by a driving circuit so that an alternating current flows around the circuit thus formed, and a control configured to sense whether a load is attached to the circuit and to disable a feedback circuit if the load is not attached to the circuit: characterized in that one auxiliary winding is used for driving a lamp and another auxiliary winding is connected by the feedback circuit to cause the line current drawn from the power line to be proportional to, in phase with, and have the same waveform shape as the power line voltage.

19. The circuit of claim 18 wherein the control comprises a sensor for determining whether a load is attached to the circuit and the control closes a switch to disable the full wave bridge rectifier if the load is not attached to the circuit.

* * * * *